United States Patent
Payne et al.

(10) Patent No.: US 9,713,962 B2
(45) Date of Patent: Jul. 25, 2017

(54) SYSTEMS AND METHODS FOR REDUCING THE COST OF VEHICLE CHARGING BASED ON ROUTE PREDICTION

(71) Applicant: Toyota Motor Engineering & Manufacturing North America, Inc., Erlanger, KY (US)

(72) Inventors: Joshua D. Payne, Irvine, CA (US); Craig Cauthen, Orange, CA (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 0 days.

(21) Appl. No.: 14/869,215

(22) Filed: Sep. 29, 2015

(65) Prior Publication Data
US 2017/0088000 A1    Mar. 30, 2017

(51) Int. Cl.
*B60L 11/18*    (2006.01)
*G01C 21/34*    (2006.01)

(52) U.S. Cl.
CPC ....... *B60L 11/1838* (2013.01); *B60L 11/1861* (2013.01); *G01C 21/3469* (2013.01); *B60L 2240/60* (2013.01)

(58) Field of Classification Search
CPC B60L 11/1837; B60L 11/1838; B60L 11/184; B60L 11/1861; B60L 2240/60; G01C 21/3453; G01C 21/3469
See application file for complete search history.

(56) References Cited

U.S. PATENT DOCUMENTS

| 8,204,638 | B2 | 6/2012 | Tani et al. |
| 8,229,615 | B2 | 7/2012 | Sakamoto et al. |
| 8,249,933 | B2 | 8/2012 | Sakakibara et al. |
| 8,798,830 | B2 | 8/2014 | Sobue et al. |
| 8,825,243 | B2 | 9/2014 | Yang et al. |
| 8,963,494 | B2 | 2/2015 | Kishiyama et al. |
| 8,975,866 | B2 | 3/2015 | McGrath et al. |
| 9,000,722 | B2 | 4/2015 | Uyeki |
| 2011/0225105 | A1* | 9/2011 | Scholer .................. G06Q 50/06 705/412 |
| 2012/0173134 | A1* | 7/2012 | Gutman ............. G01C 21/3469 701/400 |
| 2012/0249068 | A1 | 10/2012 | Ishida et al. |

(Continued)

FOREIGN PATENT DOCUMENTS

JP    2012-123637    6/2012

*Primary Examiner* — Aaron L Troost
(74) *Attorney, Agent, or Firm* — Snell & Wilmer LLP

(57) ABSTRACT

A system for cost-effective charge planning for a battery of a vehicle includes a battery having a SOC corresponding to an amount of energy stored by the battery. The system also includes an internal electric vehicle charger capable of receiving energy from a charging station and transferring the energy to the battery to increase the SOC. The system includes an electronic control unit (ECU) that can predict a route set including a first destination and a second destination and an amount of time spent at each. The ECU can determine charge planning data including an amount of energy required to reach the first and second destinations and a cost of energy at the first and second destinations. The ECU can determine how much to charge the battery at the first destination and at the second destination based on the predicted route set and the determined charge planning data.

20 Claims, 10 Drawing Sheets

(56) References Cited

U.S. PATENT DOCUMENTS

| | | |
|---|---|---|
| 2013/0093393 A1 | 4/2013 | Shimotani et al. |
| 2013/0096751 A1 | 4/2013 | Riley et al. |
| 2013/0282472 A1 | 10/2013 | Penilla et al. |
| 2013/0325335 A1 | 12/2013 | Kee et al. |
| 2013/0339072 A1 | 12/2013 | Touge |
| 2014/0101041 A1 | 4/2014 | Yamamoto |
| 2014/0257608 A1* | 9/2014 | Dufford ................ B60W 20/40 701/22 |
| 2015/0241233 A1* | 8/2015 | Loftus ................ G01C 21/3682 701/410 |
| 2016/0176306 A1* | 6/2016 | Outwater ............ B60L 11/1825 320/138 |

\* cited by examiner

| ROUTE SET | DAYS | | LENGTH OF TIME AT DESTINATION | CHARGE TO NEXT DESTINATION | COST OF POWER AT AVAILABLE CHARGING TIME | REMAINING SOC AT DESTINATION | SOC REQUIRED TO REACH 2ND DESTINATION | SOC REQUIRED TO REACH 3RD DESTINATION | SOC TO ADD AT DESTINATION |
|---|---|---|---|---|---|---|---|---|---|
| 1 | T, H | HOUSE TO WORK | 8 HOURS | 60% | $0.25 PER KWH | 40% | 60% | N/A | 30% |
| | | WORK TO HOUSE | 15 HOURS | 60% | $0.12 PER KWH | 10% | N/A | N/A | FILL UP |
| 2 | S | HOUSE TO PARK | 3 HOURS | 40% | $0.08 PER KWH | 60% | 40% | N/A | FILL UP |
| | | PARK TO HOUSE | 19 HOURS | 40% | $0.12 PER KWH | 60% | N/A | N/A | FILL UP |
| 3 | M, W, F | HOUSE TO WORK | 8 HOURS | 60% | $0.25 PER KWH | 40% | 35% | 70% | 40% |
| | | WORK TO SCHOOL | 1/4 HOURS | 35% | $0.15 PER KWH | 45% | 35% | N/A | 0% |
| | | SCHOOL TO HOUSE | 15 HOURS | 35% | $0.12 PER KWH | 10% | N/A | N/A | FILL UP |

SYSTEMS AND METHODS FOR REDUCING THE COST OF VEHICLE CHARGING BASED ON ROUTE PREDICTION

BACKGROUND

Field

The present invention relates to systems and methods for providing cost-efficient charge planning for electric or plug-in hybrid vehicles based on a predicted combination of routes of the vehicle and costs of energy at various destinations of the vehicle.

Description of the Related Art

The number of electric and plug-in hybrid vehicles that are in use is increasing for many reasons including the rising cost and potentially harmful environmental effects of gasoline. These vehicles can typically be charged (i.e., receive electrical energy via an external charger coupled to a power source) and store the received electrical energy into an onboard battery. The quantity and availability of these chargers has been steadily increasing due to the rising popularity of these vehicles. For example, electrical and plug-in hybrid vehicle owners now can install external chargers for powering these vehicles in their homes and many office buildings now have external chargers in their parking lots for employees working in the buildings.

The cost of electrical energy can vary greatly based on a time of day and the particular power source from where the energy is received. For example, energy is typically more expensive during the daytime than at nighttime, and may be more expensive at an office building than at the user's house. Some users will charge their vehicle at any location at which a power source is available, regardless of the cost, in order to reduce the likelihood of total depletion of available electrical energy during a trip. Even if these users desire to reduce charging costs, they may not take any action due to the difficulty in learning and remembering the cost of power at various locations and times.

Thus, there is a need in the art for methods and systems that can determine a cost-efficient charging plan for an electric vehicle or a plug-in hybrid vehicle based on costs of energy at various locations and times of day.

SUMMARY

The present invention relates to systems and methods for cost-effective charging of an electrical vehicle. A system for cost-effective charge planning for a battery of a vehicle can include a battery having a state of charge (SOC) corresponding to a current amount of electrical energy stored by the battery. The system also includes an internal electric vehicle charger coupled to the battery and adapted to receive electrical energy from a charging station and transfer the electrical energy to the battery to increase the SOC of the battery. The system also includes an electronic control unit (ECU). The ECU can predict a route set including a first destination and a second destination and an amount of time spent at each. The ECU can also determine charge-planning data including an amount of electrical energy required to reach the first destination from a current location, an amount of electrical energy required to reach the second destination from the first destination, a cost of electrical energy at the first destination and a cost of electrical energy at the second destination. The ECU can also determine how much to charge the battery at the first destination and at the second destination based on the predicted route set and the determined charge planning data.

A vehicle capable of cost-effective charge planning can include a battery having a state of charge (SOC) corresponding to a current amount of electrical energy stored by the battery. The vehicle can also include a navigation unit configured to detect a current location of the vehicle and to predict a route set including a first destination and a second destination and an amount of time spent at each. The vehicle can also include an internal electric vehicle charger coupled to the battery and configured to receive electrical energy from a charging station and transfer the electrical energy to the battery to increase the SOC of the battery. The vehicle can also include an electronic control unit (ECU) coupled to the navigation unit. The ECU can determine an amount of electrical energy required to reach the first destination from the current location, an amount of electrical energy required to reach the second destination from the first destination, a cost of electrical energy at the first destination and a cost of electrical energy at the second destination. The ECU can also determine how much to charge the battery at the first destination and at the second destination based on the predicted route set, the SOC of the battery and the determined charge planning data.

A method for cost-effective charge planning of a battery of a vehicle can include predicting, by an electronic control unit (ECU), a route set including a first destination and a second destination and an amount of time spent at each. The method can also include determining, by the ECU, charge planning data. The charge planning data includes a current SOC of the battery, an amount of electrical energy required to reach the first destination from a current location, an amount of electrical energy required to reach the second destination from the first destination, a cost of electrical energy at the first destination and a cost of electrical energy at the second destination. The ECU can also determine how much to charge the battery at the first destination and at the second destination based on the predicted route set and the determined charge planning data.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention, wherein:

FIG. 4 is a table illustrating charge planning data in an exemplary database of a memory of the vehicle of FIG. 1 according to an aspect of the present invention;

DETAILED DESCRIPTION

Disclosed herein are systems, vehicles and methods for determining and implementing cost-effective charge planning of an electric or plug-in hybrid vehicle. The systems and methods provide several benefits and advantages such as helping a driver reduce vehicle-charging costs. Reduced costs are achieved by controlling the vehicle to receive more electrical energy from relatively inexpensive charging stations. This cost-effective charge planning provides benefits and advantages such as eliminating the need for the driver to learn or remember the cost of electrical energy at various locations and times of day. The systems and methods provide additional benefits and advantages such as increasing the likelihood that a vehicle battery has sufficient electrical energy to reach each destination. The systems and methods provide further benefits and advantages such as controlling the battery to have sufficient energy to allow the driver to take a detour or to compensate for heavy traffic without total discharge of the available electrical energy. Other benefits and advantages include that the driver can disable the charge planning features of the vehicle to ensure that the battery can be completely charged at any time, allowing for driving of non-learned routes.

An exemplary vehicle includes a battery for storing energy. The vehicle also includes a battery management system for determining the current amount of energy stored by the battery, or the state of charge (SOC) of the battery. The vehicle also includes a navigation unit capable of detecting a current location of the vehicle. The vehicle also includes an electronic control unit (ECU). At least one of the navigation unit or the ECU can predict a route set that includes at least two predicted routes and predicted amounts of time spent at each destination. The route set can be predicted based on previously detected data, the current location, the current time of day and/or the current day of the week. The ECU can also determine an amount of energy required to reach each destination of the route set and a cost of energy at each of the destinations. The ECU can then determine how much charge to receive at each of the destinations of the route set based on the amount of time spent at each destination, the amount of energy required to reach each destination and the cost of energy at each destination.

Figure 1:
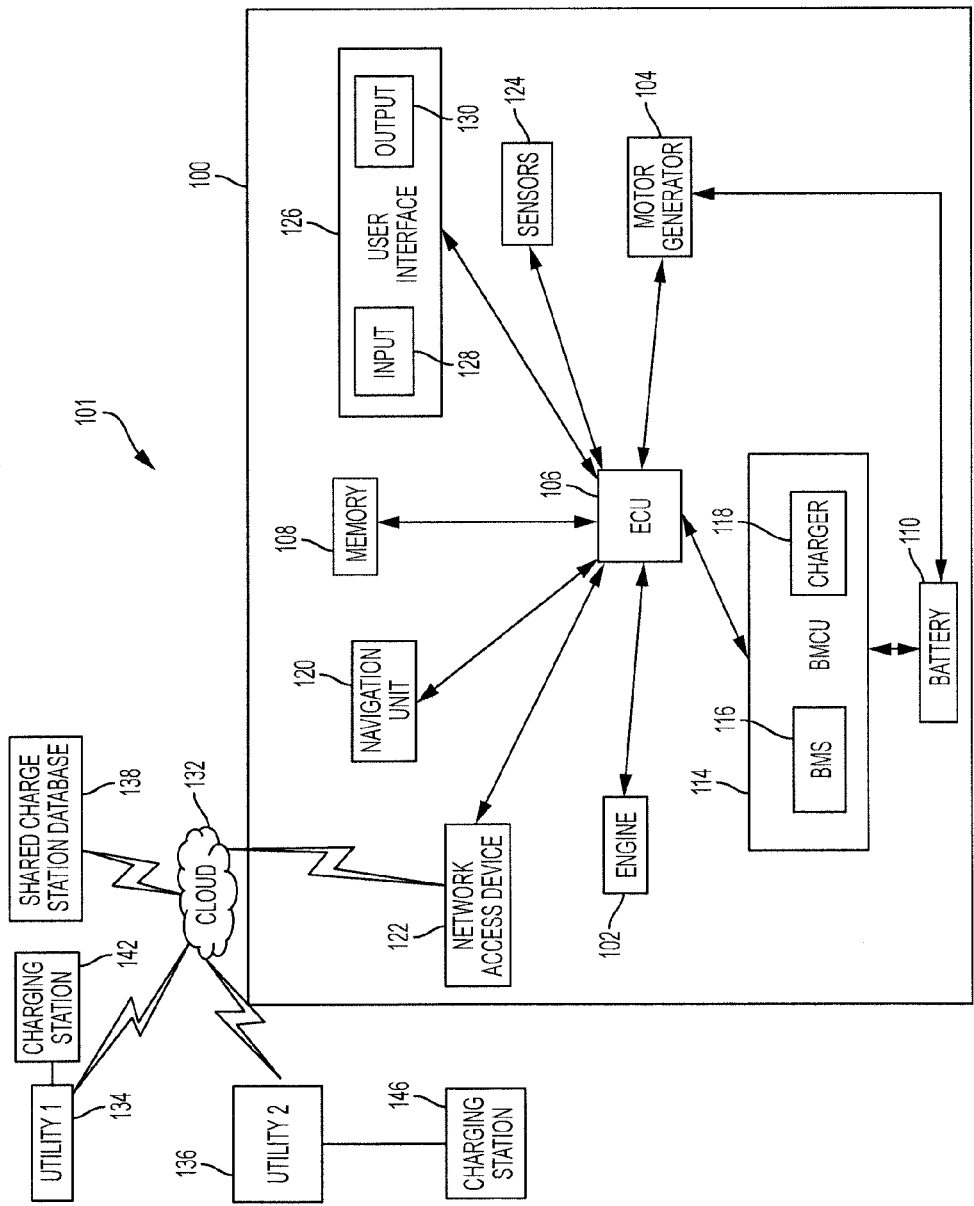
FIG. 1 is a block diagram of a vehicle/system that utilizes route prediction to determine how much to charge a battery at each destination along a route set in order to reduce an overall charging cost according to an aspect of the present invention.

With reference to FIG. 1, a system 101 for cost-efficient charge planning of a vehicle 100 based on route prediction includes the vehicle 100, a shared charge station database 138, at least one charging station and at least one utility company.

The embodiment illustrated in FIG. 1 includes a first charging station 142 coupled to a first utility company 134 and a second charging station 146 coupled to a second utility company 136. Any number of charging stations and/or utility companies can be coupled together in any configuration. For example, two or more charging stations can be coupled to a single utility company. In some embodiments, a system may not include the shared charge station database 138.

The first utility company 134 can control the distribution of energy throughout one or more locations and can collect payment for any electric energy received by customers. The first charging station 142 is coupled to and can be controlled by the first utility company 134. Electric energy can be transferred to the vehicle 100 from the first utility company 134 via the first charging station 142 and the first utility company 134 can collect payment for the energy received from the first charging station 142. The second charging station 146 and second utility company 136 can operate in a similar manner as the first charging station 142 and first utility company 134.

The vehicle 100 includes features that allow it to learn the driver's routes over time such that future routes can be predicted. Once the vehicle 100 learns the driver's routes, it can predict how much charge is necessary to complete the route and cost of power at each location and can then control battery charging based on this information.

The vehicle 100 can include an engine 102, a motor/generator 104, an ECU 106, a memory 108, a battery 110 and a battery management and control unit (BMCU) 114 including a battery management system (BMS) 116 and an internal electric vehicle charger 118. The vehicle 100 can also include a navigation unit 120, a network access device 122, one or more sensors 124 and a user interface 126 having an input device 128 and/or an output device 130.

The motor/generator 104 can convert electrical energy into mechanical power, such as torque, and can convert mechanical power into electrical energy. In that regard, the battery 110 is coupled to the motor/generator 104 and can provide electrical energy to and receive electrical energy from the motor/generator 104. In some embodiments, the vehicle 100 can include one or more additional power generation devices such as the engine 102 or a fuel cell stack. The engine 102 combusts fuel to provide power instead of and/or in addition to the power supplied by the motor/generator 104. In that regard, the vehicle 100 can be an electric vehicle, a plug-in hybrid vehicle or any other type of vehicle that includes a battery and a motor/generator and can receive electrical energy from a charger.

The battery 110 can include one or more rechargeable batteries. The battery 110 can store energy, for example in the form of chemical energy, and provide the energy to the motor/generator 104. The motor/generator 104 can then convert the energy from the battery 110 into mechanical power. The motor/generator 104 can also provide energy back to the battery 110, for example, via regenerative braking.

The BMCU 114 may be coupled to and control the operation of the battery 110. The BMS 116 may measure, using battery sensors (not shown), parameters used to determine the SOC of the battery 110. For example, the battery sensors may measure a voltage, a current, a temperature, a charge acceptance, an internal resistance, self-discharges, magnetic properties, a state of health/or other states or parameters of the battery 110. The SOC may be a percentage or a ratio relative to another predetermined value associated with the battery 110. In some embodiments, the BMS 116 can determine the SOC of the battery 110 based on the detected parameters. In some embodiments, the ECU 106 can receive the detected parameters and determine the SOC based on the parameters. For example, the ECU 106 can determine the SOC of the battery 110 based on an energy value stored in the battery 110 relative to the current charging capacity of the battery 110.

The internal electric vehicle charger 118 can receive electrical energy from an external source, such as the first charging station 142 or the second charging station 146. In that regard, the internal electric vehicle charger 118 can receive electrical energy from the first charging station 142 or the second charging station 146 and transfer the electrical energy to the battery 110, thus charging the battery 110.

In some embodiments, the internal electric vehicle charger 118 can receive energy in one or more ways. For example, the internal electric vehicle charger 118 can receive energy via a cable connected to a charging station. In some embodiments, the internal electric vehicle charger 118 may be configured to receive energy without cables or wires, such as via inductive charging. In these embodiments, the internal electric vehicle charger 118 can receive wireless energy as long as the internal electric vehicle charger 118 is within a predetermined distance of a wireless charging station. In this aspect, the battery 110 can receive energy without any action from the driver. In some aspects, the vehicle 100 can be an autonomous vehicle capable of self-maneuvering. In that regard, the vehicle 100 can implement the systems and methods disclosed herein to determine an optimal charge plan and maneuver itself relative to external chargers to implement the optimal charge plan.

The ECU 106 may be electrically coupled to some or all of the components of the vehicle 100. The ECU 106 can include one or more processors or controllers specifically designed for automotive systems, and the functions of the ECU 106 can be implemented in a single ECU or in multiple ECUs. The ECU 106 can receive data from one or more components and control the operation of one or more components based on the received or determined data. For example, the ECU 106 can receive data detected by the BMS 116 to determine the SOC of the battery 110 and may control the motor/generator 104 based on the determined SOC of the battery 110. The ECU 106 can also control the operation of the internal electric vehicle charger 118 to start or stop charging of the battery 110. In another exemplary aspect, the ECU 106 can control actuators within the engine 102 to improve the performance of the engine 102.

The memory 108 is coupled to the ECU 106 and can include one or more of a RAM or other volatile or non-volatile memory. The memory 108 may be a non-transitory memory or a data storage device, such as a hard disk drive, a solid state disk drive, a hybrid disk drive, or other appropriate data storage, and may further store machine readable instructions which may be loaded and executed by the ECU 106.

The sensors 124 can include one or more sensors for detecting various parameters regarding units and/or devices of the vehicle 100. For example, the sensors 124 may include a vehicle speed sensor, a battery temperature sensor, a grade detection sensor, an inertial measurement unit (IMU) or the like.

The navigation unit 120 includes a GPS unit (not shown) for detecting location data. The navigation unit 120 can provide navigation instructions based on detected location data and may include a memory (not shown) for storing route data and/or store the route data in the memory 108. The navigation unit 120 may also include or receive data from other sensors capable of detecting data corresponding to location information. For example, the other sensors can include a gyroscope, an accelerometer or the like. In some embodiments, the navigation unit 120 also includes a processor for predicting routes based on location data detected by the GPS, a current day of the week, a current date, a current time and/or other factors. In some embodiments, the ECU 106 performs the route prediction instead of or in addition to the navigation unit 120.

The navigation unit 120 may be integral to the vehicle 100, may be a separate unit coupled to the vehicle 100, or may be separate from the vehicle (such as a mobile telephone with navigation capability). When the navigation unit 120 is separate from the vehicle, it can communicate with the vehicle 100 via the network access device 122. In some embodiments, the vehicle 100 may include a GPS unit instead of the navigation unit. In that regard, the ECU 106 may perform the functions of the navigation unit 120 based on data received from the GPS unit. Herein, navigation functions will be discussed as if they are performed by the ECU 106. However, one skilled in the art will realize that navigation functions may also or instead be performed by the navigation unit 120. Navigation functions can include route and route set prediction, providing navigation instructions, receiving user input such as verification of determined routes and route sets or destinations, or the like.

The input device 128 can include any device capable of receiving user input, such as a button, a dial, a microphone, or the like. The output device 130 can include any device capable of providing output to a user, such as a display, a speaker, a refreshable braille display, or the like. In some embodiments, the user interface 126 may comprise a single input/output device such as a touch screen that is capable of receiving input and outputting image and/or audio data. The user interface 126 allows a driver or passenger of the vehicle 100 to communicate with the ECU 106. For example, the driver may be able to provide data to the ECU 106 and/or receive feedback from the ECU 106 via the user interface 126. The navigation unit 120 may include a user interface separate from the user interface 126 and/or may communicate via the user interface 126.

The network access device 122 may include a communication port or channel, such as one or more of a WiFi unit, a Bluetooth® unit, a radio frequency identification (RFID) tag or reader, a cellular network unit for accessing a cellular network (such as 3G or 4G) or the like. The network access device 122 can transmit data to and receive data from devices and systems not directly connected to the vehicle 100. For example, the ECU 106 can communicate with the first utility company 134, the second utility company 136 and/or the shared charge station database 138 via the network access device 122. Furthermore, the network access device 122 may access the cloud 132, to which the first utility company 134, the second utility company 136 and/or the shared charge station database 138 are also connected.

As mentioned above, the ECU 106 can predict routes of the vehicle 100 based on one or more factors including detected location data, a current time, a current date, a current day of the week, previously-stored route data or the like. In a similar aspect, the ECU 106 and/or the navigation unit 120 may also be capable of predicting a route set that includes two or more routes based on the above-listed factors. For example, if the driver drives to work at 8:00 a.m. every weekday and then drives home at 5:00 p.m. every weekday, the ECU 106 may predict that the vehicle 100 is going to travel to the driver's work place at 8:00 a.m. and return to the driver's house at 5:00 p.m.

Various methods of route prediction are known in the art. For example, patent application Ser. No. 14/708,051, titled "Systems And Methods For Improving Energy Efficiency Of A Vehicle Based On Route Prediction" and filed on May 8, 2015, discloses an algorithm for predicting routes and route sets, the contents of which are hereby incorporated by reference in their entirety. As another example, patent application Ser. No. 14/230,557, titled "System And Method For Improving Energy Efficiency Of A Vehicle Based On Known Route Segments" and filed on Mar. 31, 2014, discloses a method for route prediction and route set prediction, the contents of which are hereby incorporated by reference in their entirety.

The ECU 106 may also be capable of predicting an amount of time spent at each location (and may thus predict a time of day that the vehicle 100 will be at each location based on the predicted amount of time spent at each location and a current time). For example, if a driver typically stays at his workplace for eight hours on weekdays, the ECU 106 may predict that the user will stay at his work place for eight hours on future trips. In some embodiments, the ECU 106 can average an amount of time spent at each location. For example, if the driver stays at his workplace for 8.5 hours one day and 8 hours the next day, the ECU 106 may use the value of 8.25 hours as the expected time that the driver will stay at his workplace. In some embodiments, the ECU 106 may remove outliers. For example, if the driver stays at his workplace for 8.5 hours one day, 8 hours the next day and 12 hours the next day, the ECU 106 may still use the value of 8.25 hours as the expected time that the driver will stay at his workplace. The ECU 106 can also use another method for predicting an amount of time spent at a destination, such as selecting a median amount of time.

The ECU 106 can perform particular operations when a route or route set is predicted. However, the predicted routes and route sets may not always be accurate and/or sufficient information to predict a route or route set may not be available. To account for potential inaccuracies, the ECU 106 can determine a confidence value corresponding to a certainty that the predicted route or route set is correct. The ECU 106 may then compare the determined confidence value to a threshold confidence value. The ECU 106 may act as though no route has been predicted if the confidence value of the prediction is less than the threshold confidence value. Stated differently, the ECU 106 may perform certain operations if the confidence value that the predicted route set is the correct route set is greater than the threshold confidence value. The threshold confidence value may be set to any threshold amount. For example, it may be a 60% confidence, an 80% confidence or the like.

The ECU 106 can determine when to charge the battery 110 based on a predicted route set and an amount of time spent at each location of the route set. The ECU 106 may be configured to do so only when the determined confidence value is above the threshold confidence value. For example, it is desirable to wait to charge until the vehicle 100 arrives at a relatively inexpensive charging station. Thus, if the ECU 106 predicts that the vehicle 100 will arrive at a next destination having relatively inexpensive energy with sufficient time to charge the battery 110, the ECU 106 may control the internal electric vehicle charger 118 to deny charging at a more expensive current location and wait until the vehicle 100 reaches the next destination. However, it is undesirable for the ECU 106 to deny charging at the current location if it is not sufficiently confident that the predicted next route is accurate. This is so because refusing charging based on an inaccurate prediction can cause the SOC of the battery 110 to drop below a minimum SOC limit, or to be so low that the vehicle 100 cannot reach the actual destination. Thus, the ECU 106 may not control the internal electric vehicle charger 118 to deny charging if the confidence value that the predicted next route is accurate is below the threshold confidence value.

In some embodiments, the ECU 106 may control the amount of charge received by the internal electric vehicle charger 118 based on the confidence value when the confidence value is between the threshold confidence value and 100 percent (100%) confidence. Continuing the above example, if the confidence threshold is 60% and the determined confidence value is 80%, the ECU 106 may instruct the internal electric vehicle charger 118 to accept some charge at the current location, but not to increase the SOC of the battery 110 to a maximum SOC limit. When the confidence threshold is 90%, the ECU 106 may instruct the internal electric vehicle charger 118 to accept less charge at the current location than when the confidence value is 80%.

In some embodiments, the ECU 106 may use a second threshold confidence value and act as though confidence values above the second threshold confidence value correspond to 100% confidence value. For example, a lower threshold confidence value may be 60% and a higher threshold confidence value may be 85%. If the determined confidence value is 90%, the ECU 106 may control the charging of the battery 110 as if the determined confidence value is 100%.

Turning the discussion to charging of the battery 110, the first charging station 142 can receive energy from the first utility company 134, and the second charging station 146 can receive energy from a second utility company 136. As an example, the first charging station 142 may be positioned at the user's house and the second charging station 146 may be positioned at the driver's workplace.

The internal electric vehicle charger 118 can receive energy from a charging station, such as wirelessly or via a cable. For example, the internal electric vehicle charger 118 may receive energy from the first charging station 142 or the second charging station 146.

In some embodiments, the internal electric vehicle charger 118 can determine or receive a cost of energy (e.g., dollars per kilowatt-hours ($/KWH)) from a connected charging station. For example, the first charging station 142 may also be connected to a first utility company 134 and can receive cost of energy data from the first utility company 134. The internal electric vehicle charger 118 can then receive the cost of energy data from the first utility company 134 via the first charging station 142. The internal electric vehicle charger 118 may then transmit the received cost to the ECU 106.

In some embodiments, the ECU 106 can determine the cost of energy from the first charging station 142 or the second charging station 146 via the network access device 122. For example, the navigation unit 120 can determine that the vehicle 100 is near the first charging station 142. The ECU 106 may receive this data and query the first charging station 142 via the network access device 122 and may receive cost of energy data in return. For example, the first charging station 142 may also include a network access device (not shown) and may communicate directly with the network access device 122 of the vehicle 100. In some embodiments, the ECU 106 can determine that the first charging station 142 is located at the next destination. The ECU 106 can then query, via the network access device 122, the first utility company 134 to determine the cost of energy data corresponding to the first charging station 142.

The cost of energy can vary based on the time of day and the location of the charging station. For example, energy is typically inexpensive at nighttime relative to daytime. Thus, the cost of energy data at each charging stations may include a cost of energy at various times of day. Also, a charging station in a city may be more expensive than a charging station in a suburb or vice versa.

In some embodiments, the ECU 106 may create a database including a list having a plurality of chargers and corresponding cost of energy data (and potentially locations of the chargers) in the memory 108. In that regard, the ECU 106 may query the memory 108 to determine the cost of energy from charging stations when performing charge-planning operations.

In some embodiments, the ECU 106 can also or instead store a list of the plurality of chargers and corresponding cost of energy data (and potentially locations of the chargers) in the shared charge station database 138. ECUs of various vehicles can access and edit the shared charge station database 138, thus allowing for creation of a crowd-sourced database of chargers and corresponding cost of energy data. In some embodiments, the ECU 106 may periodically download the data stored in the shared charge station database 138 and store the data in the memory 108 such that the data can be accessed without using the network access device 122. This allows the ECU 106 to determine the cost of energy data even when the network access device 122 is not connected to a network.

The ECU 106 can determine a cost effective charge plan based on the cost of energy data at various charging stations and based on a predicted route set (including a predicted amount of time at each destination and/or a predicted time of day at each location). For example, the ECU 106 can predict a route set including a route from the driver's house to the driver's workplace and then a route from the driver's workplace to the driver's house with eight hours spent at the driver's workplace. The SOC of the battery 110 may be at a maximum allowed SOC prior to the vehicle 100 departing on the route set. Additionally, the ECU 106 can determine that the cost of charging at the user's house may be less than the cost of charging at the user's workplace based on the time of day that the vehicle 100 will be at each location.

The battery 110 when fully charged (to the maximum SOC limit) may not have sufficient energy to power the vehicle 100 to the driver's workplace and to the driver's house. Using a cost-effective charge planning routine, the ECU 106 can control the internal electric vehicle charger 118 to charge the battery 110 at the workplace with a sufficient amount of energy for the vehicle to reach the driver's house. The ECU 106 may also control the internal electric vehicle charger 118 to add an additional margin of energy (e.g., sufficient energy to provide for an unexpected or unpredicted additional energy drain). The margin may be great enough that the SOC of the battery 110 provides sufficient energy for the motor/generator 104 to power the vehicle 100 to the driver's house even if the driver takes an unexpected detour or significant traffic is present. When the user returns to his house, the ECU 106 may instruct the internal electric vehicle charger 118 to charge the battery 110 to the maximum SOC limit. By controlling the charging of the battery 110 in this way, the ECU 106 can cause the battery 110 to receive sufficient energy to traverse the route set while paying a minimum cost for the energy.

Figure 2A:
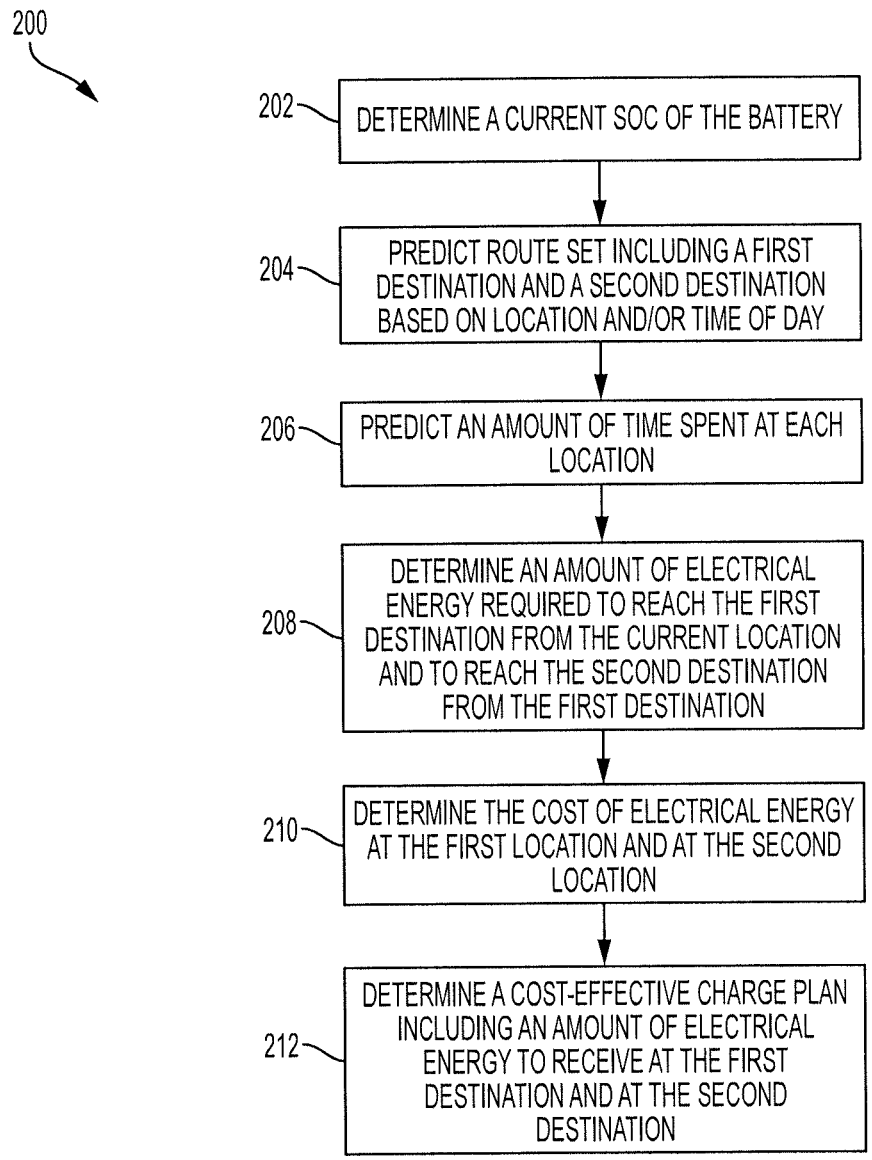
FIG. 2A is a flowchart diagram illustrating a method for determining cost-effective charge planning of a vehicle according to an aspect of the present invention.

Referring now to FIG. 2A, a method 200 for determining cost-effective charge planning is shown. The method 200 can be performed by an ECU of an electric or hybrid vehicle having similar features as the vehicle 100. In some embodiments, the ECU and/or the navigation unit of the vehicle 100 may perform one or more of the functions described below and shown in FIG. 2A.

In block 202, the ECU can determine a current SOC of the battery. In some embodiments the ECU can receive SOC data from a BMS and/or can receive detected data from a sensor coupled to the battery or from the BMS and determine the current SOC based on the received detected data.

In block 204, the ECU can predict a route set including two or more routes. For example, the route set can include a first destination and a second destination. As described above, the route set can be predicted based on various factors including a route history, a current location, a current time of day, a current day of the week or the like.

In block 206, the ECU can predict an amount of time to be spent at each location. The prediction can be based on various factors including previously-measured amounts of times, the first destination and the second destination, the day of the week or the like.

In block 208, the ECU can determine an amount of electrical energy required to reach the first destination from the current location. The ECU can determine this in a number of ways. For example, the ECU can measure an amount of energy used along each route and then store the amount of energy used in a memory. The ECU can then use a measured amount of energy from a previous trip along the route or an average of measured amounts of energy from two or more previous trips along the route. In some embodiments, the ECU can also or instead calculate an amount of energy to be spent based on various factors. For example, the ECU can use factors such as the distance of the route, the elevation change along the route, a current amount of traffic along the route, current road conditions, energy usage rates of the vehicle, driving habits of the driver or the like. As a simple example, the ECU can calculate the amount of energy to be used along the route by multiplying the distance of the route by the energy usage rates of the vehicle.

In block 210, the ECU can determine the cost of electrical energy at the first location and the second location. As described above, the ECU can query a local or remote database, and/or can query one or more utility companies or charging stations.

In block 212, the ECU can determine a cost-effective charge plan for the route set. The cost-effective charge plan can result in the vehicle having enough electrical energy to reach each of the destinations of the route set while keeping the cost of charging to a minimum. The cost-effective charge plan can include an amount of electrical energy to receive at each of the destinations in order to prevent running out of energy while paying the lowest price for energy.

In some embodiments, the ECU can compare the cost of fuel, the amount of fuel to be used along one or more routes, the cost of energy and the amount of energy to be used along the one or more routes when determining the cost-effective charge plan. The ECU can determine whether it is less expensive to receive charge at each destination or to proceed to the next destination using gasoline or another fuel. For example, if a first destination has a relatively large cost of energy, the amount of money required to power the vehicle to the second destination using the expensive energy of the first destination may be greater than the amount of money required to power the vehicle to the second destination using the fuel. The cost-efficient charge plan can then include preventing charging at the first destination.

Figure 2B:
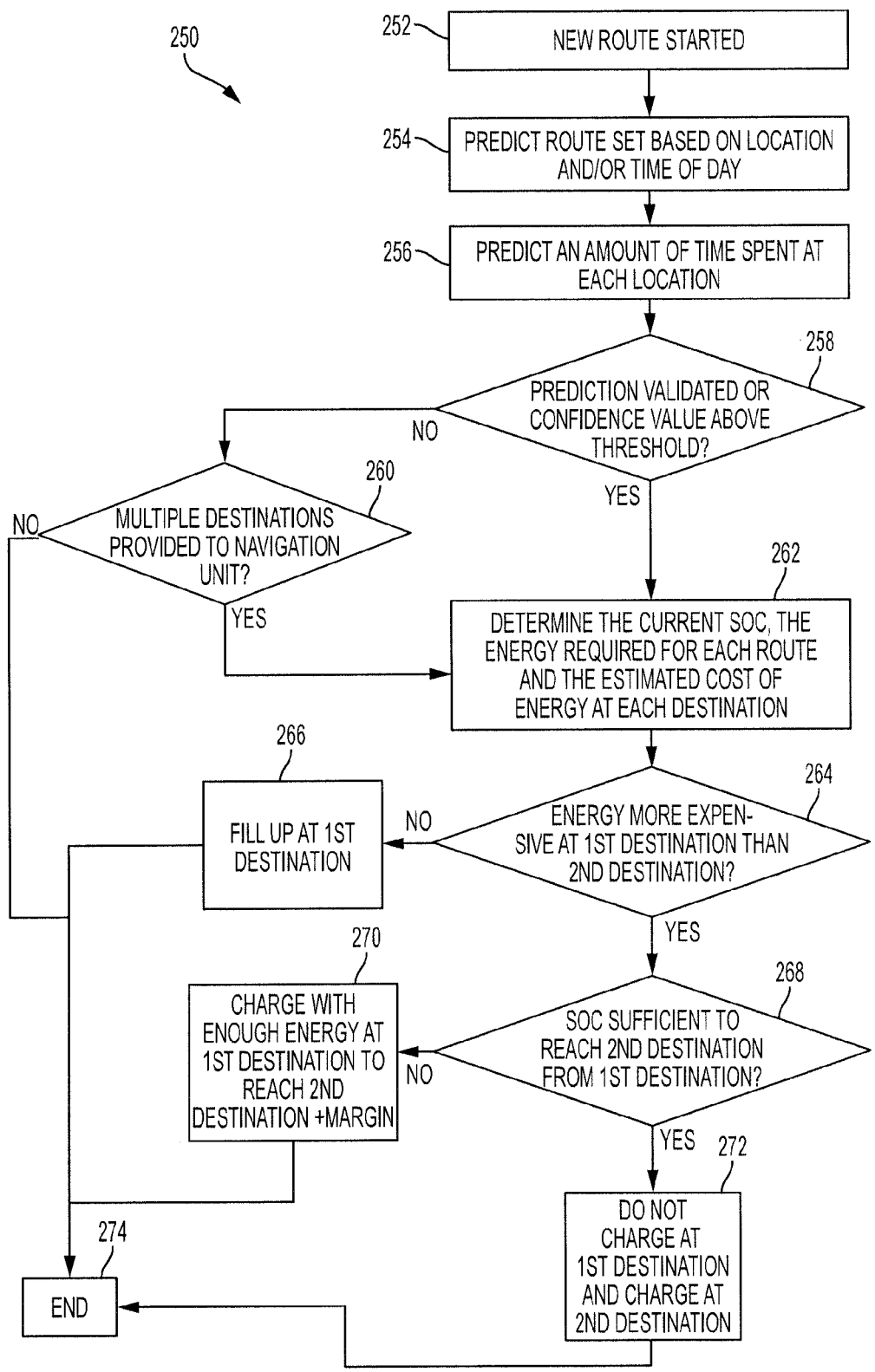
FIG. 2B is a flowchart illustrating another method for determining cost-effective charge planning of a vehicle according to an aspect of the present invention.

Turning now to FIG. 2B, another method 250 for determining cost-effective charge planning is shown. The method 250 may be performed by an ECU of an electric or hybrid vehicle having similar features as the vehicle 100. In some embodiments, the ECU and/or the navigation unit of the vehicle 100 may perform one or more of the functions described below and shown in FIG. 2B.

At block 252, the ECU can determine that the vehicle has begun a new route or route set. For example, the ECU can determine that the vehicle has begun a new route or route set when the vehicle is powered on, when the vehicle begins initial movement after being powered on or the like.

At block 254, the ECU may predict a route set based on one or more of a current location of the vehicle, a current time of day, a current day of the week, a current date or the like. In some embodiments, alternative or additional factors may be used to predict the route set. The ECU may also predict an amount of time spent at each location in block 256. The ECU can also determine what times the vehicle will be at each location based on the predicted amount of time spent at each location and a current time of day.

Many individuals have an electronic device having a stored calendar or may have a calendar stored in the cloud. In some embodiments, the ECU can communicate with the electronic device or the cloud via a network access device. The ECU may be capable of predicting a route or a route set based on data received from the calendar. For example, the calendar may include meetings at work until 6 pm and the ECU can predict that the driver will be at work until 6 pm. As another example, the calendar may include appointments at various locations throughout the day. The ECU can then predict a route set that includes destinations at the various locations.

The ECU may cause the predicted route set and/or the predicted amount of times to be displayed on an output device in block 258. The ECU can then request feedback from the user indicating whether the predicted route set and/or predicted amount of times are accurate. If the predicted route set and/or times are accurate, the method 250 may proceed to block 212.

At times, a user may input one or more destinations (and potentially an amount of time at each) using a navigation unit such that the route is known. If the amount of time at each location is not provided, the ECU may request that the user input an amount of time to be spent at each location. In some embodiments, the ECU can store time data in a memory indicating how much time a driver typically spends at particular locations. In that regard, the ECU can predict an amount of time at each location based on the stored time data and the received destinations. For example, the driver may typically spend 8 hours at work. The ECU can store an entry corresponding to work in the memory and associate the entry with 8 hours of time. When the driver inputs the work destination, the ECU can predict, based on the entry, that the driver will be at work for 8 hours.

In some embodiments, the ECU 106 can determine a confidence value for a predicted route set and/or a predicted amount of time spent at each location in addition to or instead of receiving validation data from the driver. For example, the ECU may determine the confidence value if the driver fails to validate the predicted route set. At block 208, the confidence value is compared to a confidence value threshold to determine if the confidence value is greater than the confidence value threshold. As disclosed above, the ECU can tailor its charging decisions based on the confidence value. If the confidence value is not above the confidence value threshold and the prediction was not validated by the driver, the method 200 may proceed to block 260.

In block 260, the ECU may determine whether one or more destinations have been provided to the navigation unit. For example, the driver may enter destinations after the ECU has proceeded through blocks 202 through 208. Similarly, a passenger may enter destinations as the driver is driving. If one or more destinations have been provided to the navigation unit, the method 200 may proceed to block 262. Otherwise, the method 200 may end at block 228.

In block 262, the ECU may determine the current SOC of the battery of the vehicle along with the estimated SOC required for the vehicle to travel along each route of the route set. In that regard, each time the vehicle traverses a route, the ECU may store the amount of energy required for the route in a database. After a predetermined number of trips along the route, the ECU may be able to determine or estimate an amount of energy required for the route. For example, the ECU can determine that it has a reasonable estimate of required energy for a route after three trips along the route that each correspond to a similar amount of energy (i.e., each amount of energy is within 10% or 5% of each other).

In some embodiments, the ECU can calculate an estimated amount of energy based on one or more factors. The factors can include a distance of the route, the grade of the road, the type of terrain, any change in altitude, the specifications of the motor/generator, the driving habits of the user (such as hard accelerations), a speed and direction of wind, a known or estimated amount of traffic or the like.

The ECU may also determine the cost of energy at each destination in block 262. As described above, the ECU may be capable of determining or estimating the cost of energy at each destination using various methods. For example, the ECU can communicate with one or more utilities that service each destination via a network access device to determine the cost of energy data including the cost of energy at a current or future time. The ECU can also communicate with a charging station to determine the cost of the energy data. In some embodiments, the ECU can access a local database and/or a shared database that has stored the cost of the energy data for one or more destinations.

In block 264, the ECU can determine whether energy is more expensive at the first destination than the second destination. If the energy is not more expensive at the first destination than at the second destination, in block 266 the vehicle may receive energy at the first destination until the SOC reaches an upper limit. However, if the energy is more expensive at the first destination than at the second destination, in block 268 the ECU may determine whether the SOC of the battery is sufficient to power the vehicle to the second destination from the first destination. A buffer may be added to the SOC of the battery to ensure that the vehicle can travel from the first destination to the second destination.

If the battery does not have a sufficient SOC to reach the second destination from the first destination, then the ECU can control the internal electric vehicle charger to receive a sufficient amount of energy to power the vehicle to the second destination from the first destination. However, because the energy is less expensive at the second destination than at the first destination, it is desirable to add only enough energy to reach the second destination, along with a margin of energy (e.g., a buffer). Thus, at block 270, the ECU may cause the internal electric vehicle charger to charge the battery with enough energy to reach the second destination, along with the margin of energy.

At 268, if the ECU determines that the SOC of the battery is sufficient to reach the second destination from the first destination, the ECU can instruct an internal electric vehicle charger to decline charging at the first destination. When the vehicle arrives at the second destination, the ECU can instruct the internal electric vehicle charger to charge to the maximum SOC limit.

In some embodiments, the route set may also include a third destination. In these embodiments, the ECU may further adjust the charging plan such that the battery includes enough energy to reach each destination while receiving as much energy as possible from the least expensive source. For example, if a first destination is less expensive than a second destination and more expensive than a third destination, the ECU can cause the battery to receive sufficient energy at the first destination to reach the third destination and then fill the battery to the maximum SOC limit at the third destination.

Figure 3:
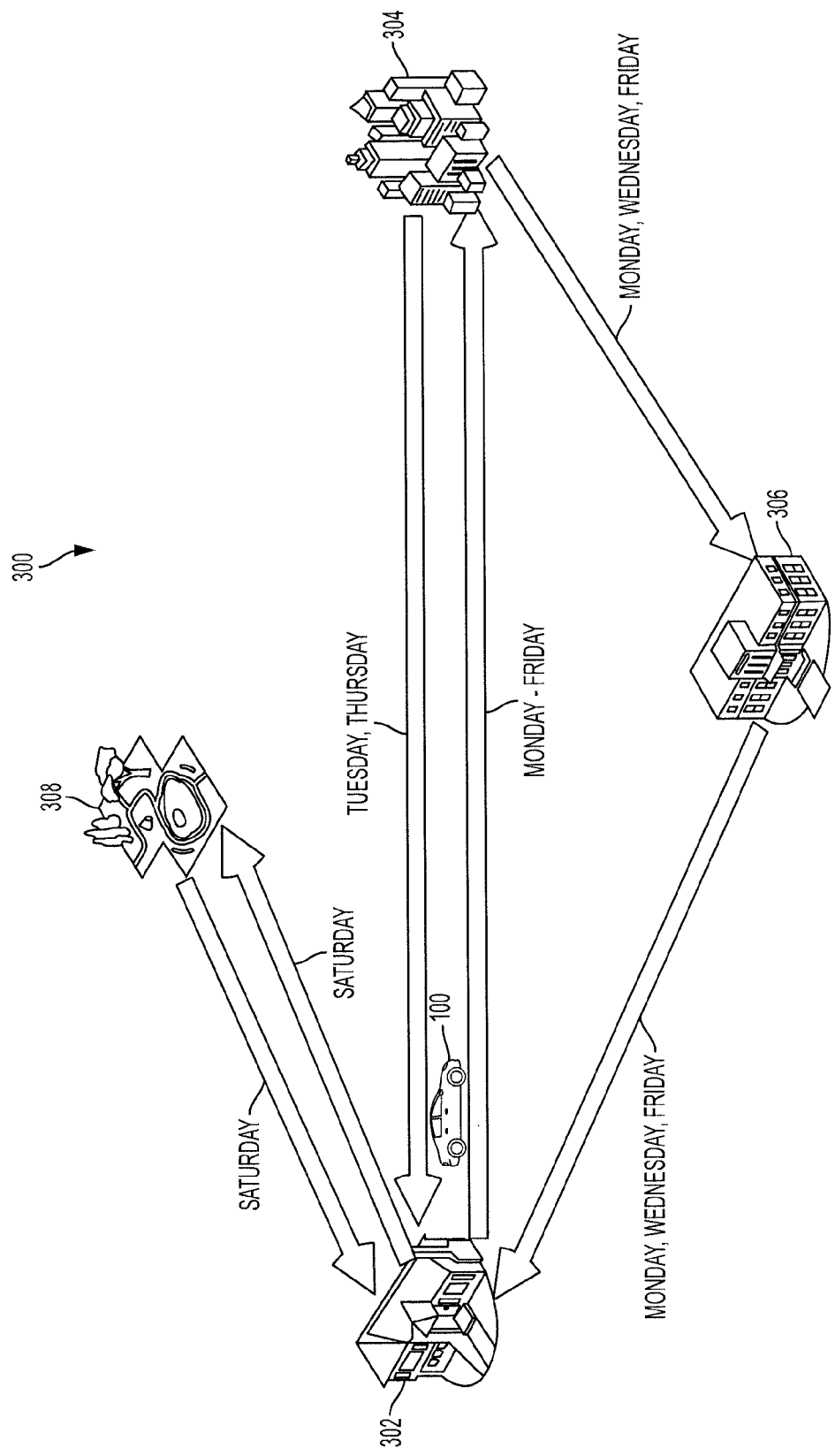
FIG. 3 shows exemplary route sets traveled by the vehicle of FIG. 1 according to an aspect of the present invention.

Referring now to FIG. 3, a map 300 illustrates various routes and route sets traveled by the vehicle 100. As shown, the vehicle 100 travels from a house 302 to a workplace 304 every Monday through Friday. On Tuesdays and Thursdays, the vehicle 100 travels from the workplace 304 to the house 302. On Mondays, Wednesdays and Fridays, the vehicle 100 travels from the workplace 304 to a school 306, for example to pick up a child, and then from the school 306 to the house 302. On Saturdays, the vehicle 100 travels from the house 302 to a park 308 and then from the park 308 to the house 302.

Referring now to FIGS. 1, 3 and 4, a chart 400 illustrates exemplary information stored in the memory 108 and/or the shared charge station database 138. The ECU 106 and/or ECUs of other vehicles may have entered the information. In some embodiments, at least some of the information (such as the cost of energy) can be received in real-time instead of or in addition to from the memory 108 or the shared charge station database 138. For example, the ECU 106 can receive a cost of energy corresponding to the first charging station 142 from the first utility company 134 via the network access device 122.

As shown, the first route set is performed on Tuesdays and Thursdays and includes a route from the house 302 to the workplace 304 and a route from the workplace 304 to the house 302. The ECU 106 may learn that the driver typically spends about eight hours at his workplace. The charge required to reach the next destination, i.e., returning to the house 302, is 60% of the available SOC of the battery 110 (i.e., 60% of the stored energy between a lower SOC limit and an upper SOC limit). Also as shown, the cost of charging at the workplace 304 is $0.25 per KWH while the cost of charging at the house 302 is only $0.12 per KWH. After the vehicle 100 reaches the workplace 304, the battery 110 will have 40% of the available SOC remaining. Because the SOC of the battery 110 is at 40% at the workplace 304 and because it will take 60% SOC to return to the house 302, the battery 110 will require an additional 20% SOC to reach the second destination (the house 302) plus any buffer if desired.

Because energy is cheaper at the house 302 than at the workplace 304, it is desirable to receive as much energy as possible at the house 302. Thus, it is desirable to add only enough energy at the workplace 304 such that the SOC is sufficient to power the vehicle from the workplace 304 to the house 302. As discussed above, it may also be desirable to include a buffer amount of energy. Thus, the ECU 106 can cause the internal electric vehicle charger 118 to add 30% SOC while the vehicle 100 is at the workplace 304. The 30% corresponds to the 20% additional energy required to reach the house 302 and a 10% buffer.

The second route set occurs on Saturdays and includes a route from the house 302 to the park 308 and a route from the park 308 to the house 302. The ECU can determine that the vehicle 100 typically spends three hours at the park 308, and it may typically require 40% of available SOC of the battery 110 for each route. The cost of energy available at a charging station of the park 308 may be $0.08 per KWH while the cost is $0.12 per KWH at the house 302. Because the cost of energy is less at the park 308 than at the house 302, it is desirable to add as much energy to the battery 110 as possible while at the park 308. Thus, the ECU 106 may instruct the internal electric vehicle charger 118 to charge the battery 110 to the maximum SOC limit while the vehicle 100 is at the park 308.

The third route set includes three routes. The first route is from the house 302 to the workplace 304, the second route is from the workplace 304 to the school 306 and the third route is from the school 306 to the house 302. The ECU 106 may determine that the cost of energy is $0.25 per KWH at the workplace 304, $0.15 per KWH at the school 306 and $0.12 per KWH at the house 302. The ECU 106 may also determine that it requires 60% SOC to reach the workplace 304, 35% SOC to reach the school 306 from the workplace 304 and an additional 35% SOC to reach the house 302 from the school 306.

Because the ECU 106 predicts that the vehicle 100 will only be at the school 306 for a quarter of an hour, the ECU 106 may determine that there is not sufficient time to charge the battery 110 while the vehicle 100 is at the school 306. Thus, the ECU 106 may cause the internal electric vehicle charger 118 to charge the battery 110 with enough energy to reach the house 302 while the vehicle 100 is at the workplace 304. However, because energy is less expensive at the house 302, the ECU 106 may cause the internal electric vehicle charger 118 to charge the battery 110 to 70% SOC (as opposed to 100% SOC), plus a margin of energy, at the workplace 304.

Figure 5:
FIG. 5 shows an interior view of the vehicle of FIG. 1 including a user interface according to an aspect of the present invention.
Figure 6:
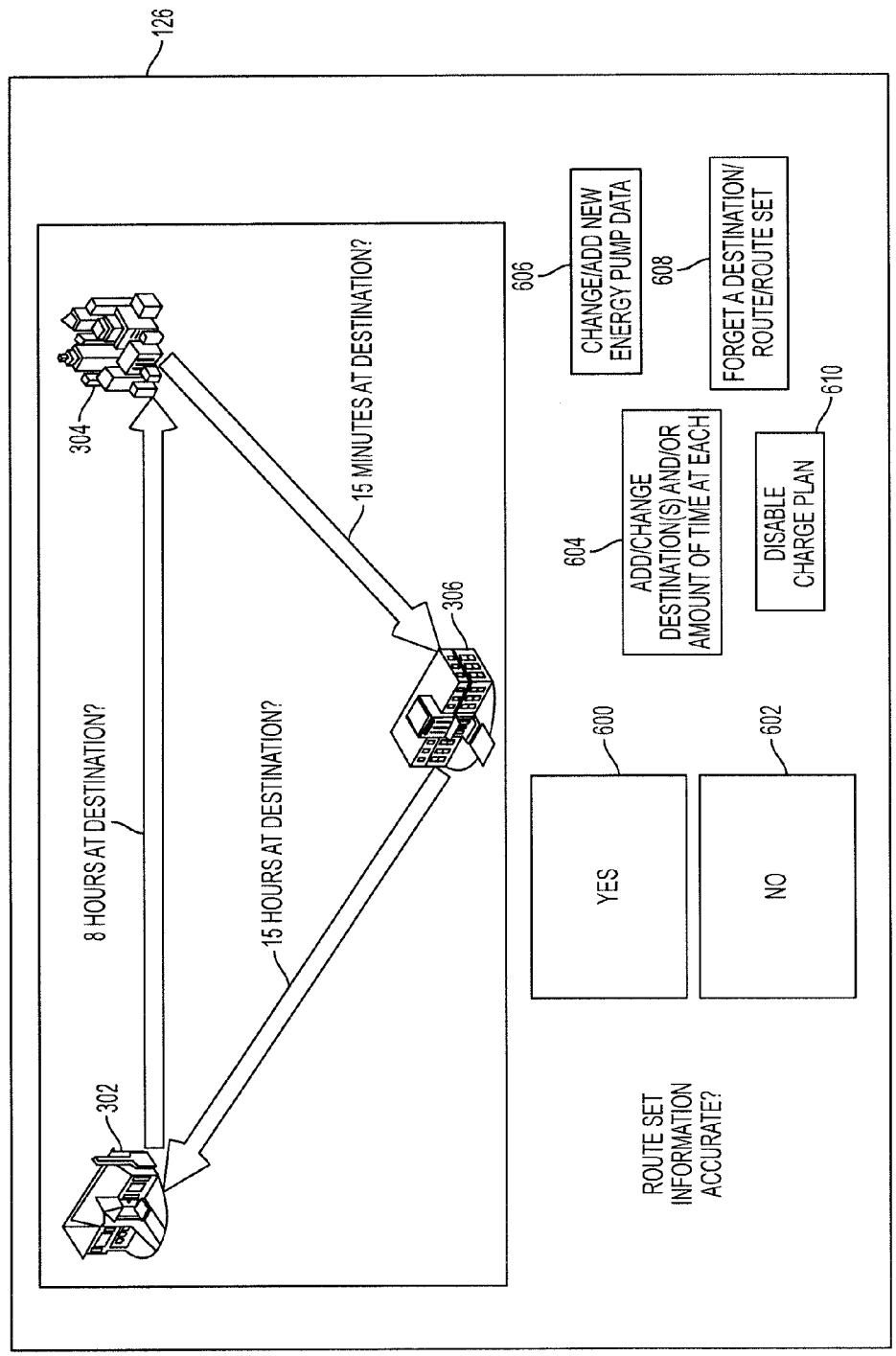
FIG. 6 shows exemplary information provided by the user interface of FIG. 5 including an option to allow a driver to confirm whether a predicted route set is accurate according to an aspect of the present invention.

With reference now to FIGS. 1, 5 and 6, the user interface 126 may output various data and receive various inputs from the driver. For example, as the driver enters the vehicle and turns the vehicle on while at the house 302, the ECU 106 may predict the route set. Assuming the day is a Monday, a Wednesday or a Friday, the ECU 106 may predict the third route as shown on the user interface 126. In some embodiments, the user interface 126 may also display the predicted amount of time to be spent at each destination and/or estimated times of arrival and/or departure from each location.

The ECU 106 may cause the user interface 126 to output data requesting verification of whether the predicted route set and/or the predicted times are accurate. The driver may be able to confirm or deny the accuracy of the predicted route and/or the predicted times using a yes button 600 and a no button 602.

The user interface 126 may also include a button 604 corresponding to an option to add or change destinations and/or an amount of time at each destination. The ECU 106 may also provide a button 606 corresponding to an option to change or add new energy pump data. The ECU 106 may also provide a button 608 corresponding to an option to forget a destination, a route and/or a route set. The ECU 106 may also provide a button 610 corresponding to an option to disable the charge planning.

The driver may occasionally decide to take a different route from one place to another, to add a destination to a route set, to take a different trip than usual for a particular day or time, or the like. It is desirable for the driver to be able to disable the charge planning for these situations so that he can increase the likelihood of the battery having sufficient charge for the non-predicted trip. By selecting the button 610, the driver can cause the ECU to allow the battery to charge as much as possible (i.e., for the battery of the SOC to increase until it reaches an upper SOC threshold) at each charging station. Thus, the battery of the vehicle may include more power than it would had the charge planning be in effect.

For example, the driver may decide to go to a ball game after work. At any point before parking at work, the driver may select the button 610. The ECU may then allow the battery to charge to the upper SOC threshold while at work, even though the energy may be more expensive. This additional SOC will increase the likelihood of the vehicle having sufficient energy to reach the ballpark and then his house afterwards.

Figure 7:
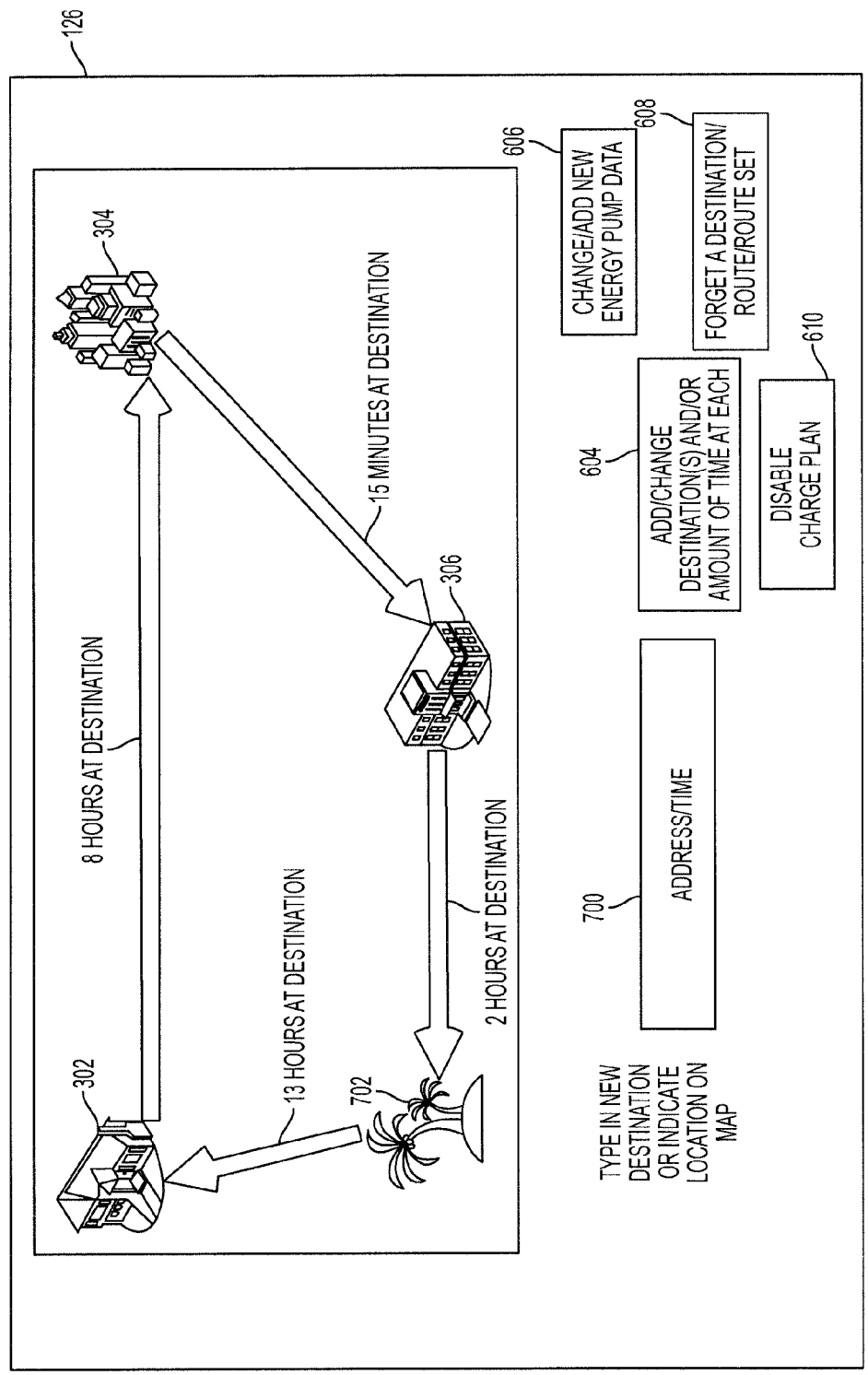
FIG. 7 shows exemplary information provided by the user interface of FIG. 5 including an option to allow a user to add a destination to a route set according to an aspect of the present invention.

The image shown in FIG. 7 corresponds to the driver having depressed the button 604. The ECU 106 of FIG. 1 may then cause the user interface 126 to provide an option for the user to add or change a destination and/or an amount of time spent at each destination. In some embodiments, the user interface 126 may output a map such that the driver can touch a location on the map to add that location as a destination. In some embodiments, the user interface 126 can provide a field 700 in which to enter a point of interest name, an address, an amount of time to be spent at a location or the like.

The ECU 106 of FIG. 1 may also provide the driver with an option to select or input a position of any newly added destination relative to the other destination(s). For example and as shown in FIG. 7, the user has entered a beach 702 as a new destination. The user has also indicated that the vehicle 100 will travel to the beach 702 from the school 306 and will travel to the house 302 after the beach 702. The user has also indicated that the vehicle will spend two hours at the beach 702.

Figure 8:
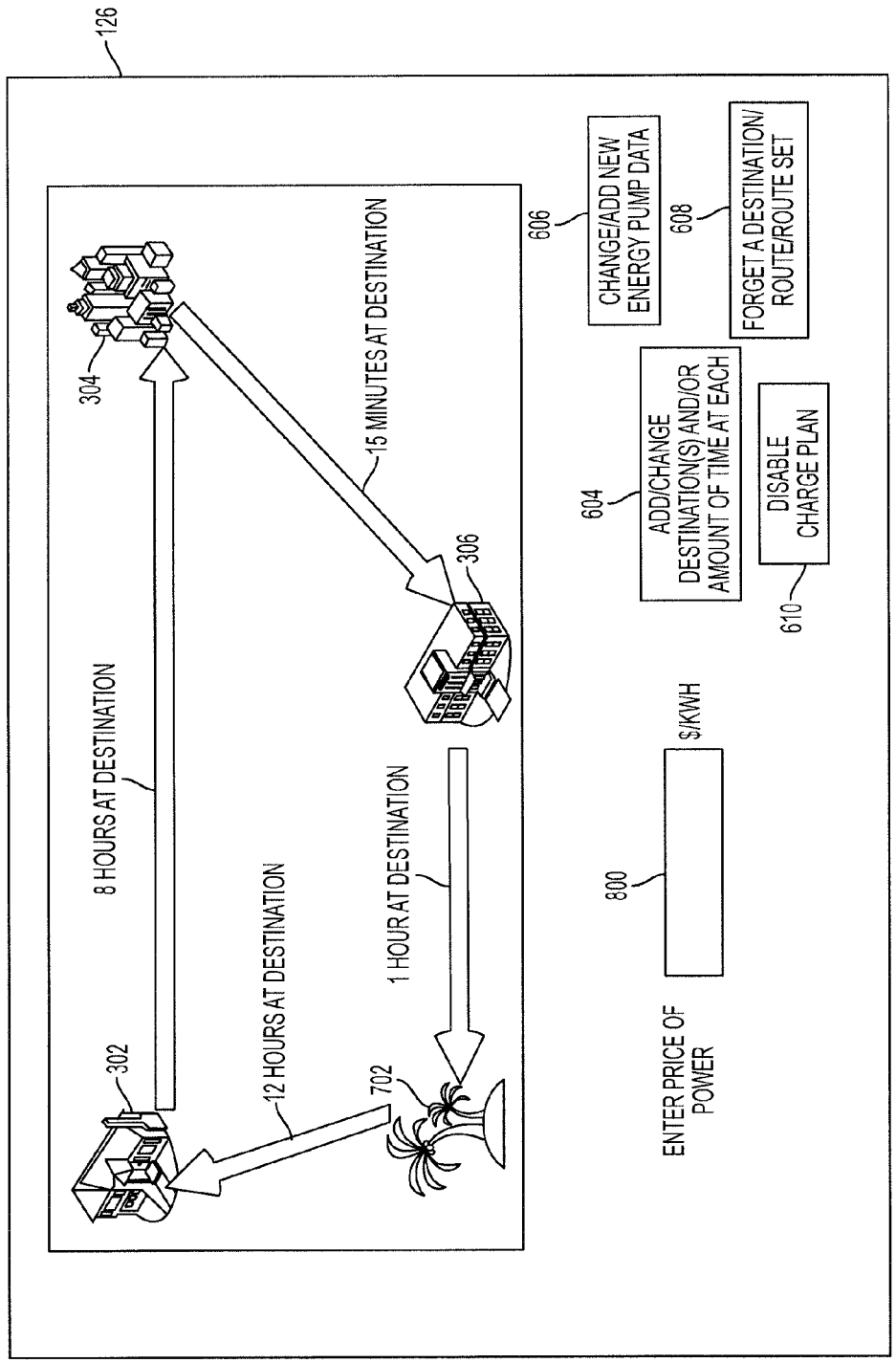
FIG. 8 shows exemplary information provided by the user interface of FIG. 5 including an option to allow a user to provide a cost of power to an electronic control unit of the vehicle of FIG. 1 according to an aspect of the present invention.

With reference now to FIG. 8, when the vehicle 100 arrives at the beach 702, the driver may see a charging station that the ECU 106 may or may not have determined is at the beach 702. Thus, the driver has selected the button 606 to change or add new energy or pump data. For example, the driver may have entered information indicating that the charging station is present at the beach 702. The driver may also input the price of energy from the charging station at the beach 702. After the driver enters the price of energy, the ECU 106 may store the learned price in a database in the memory 108 and/or in the shared charge station database 138. The driver may also use this option to change the stored price if it changes or if the price determined by the ECU 106 is incorrect.

Figure 9:
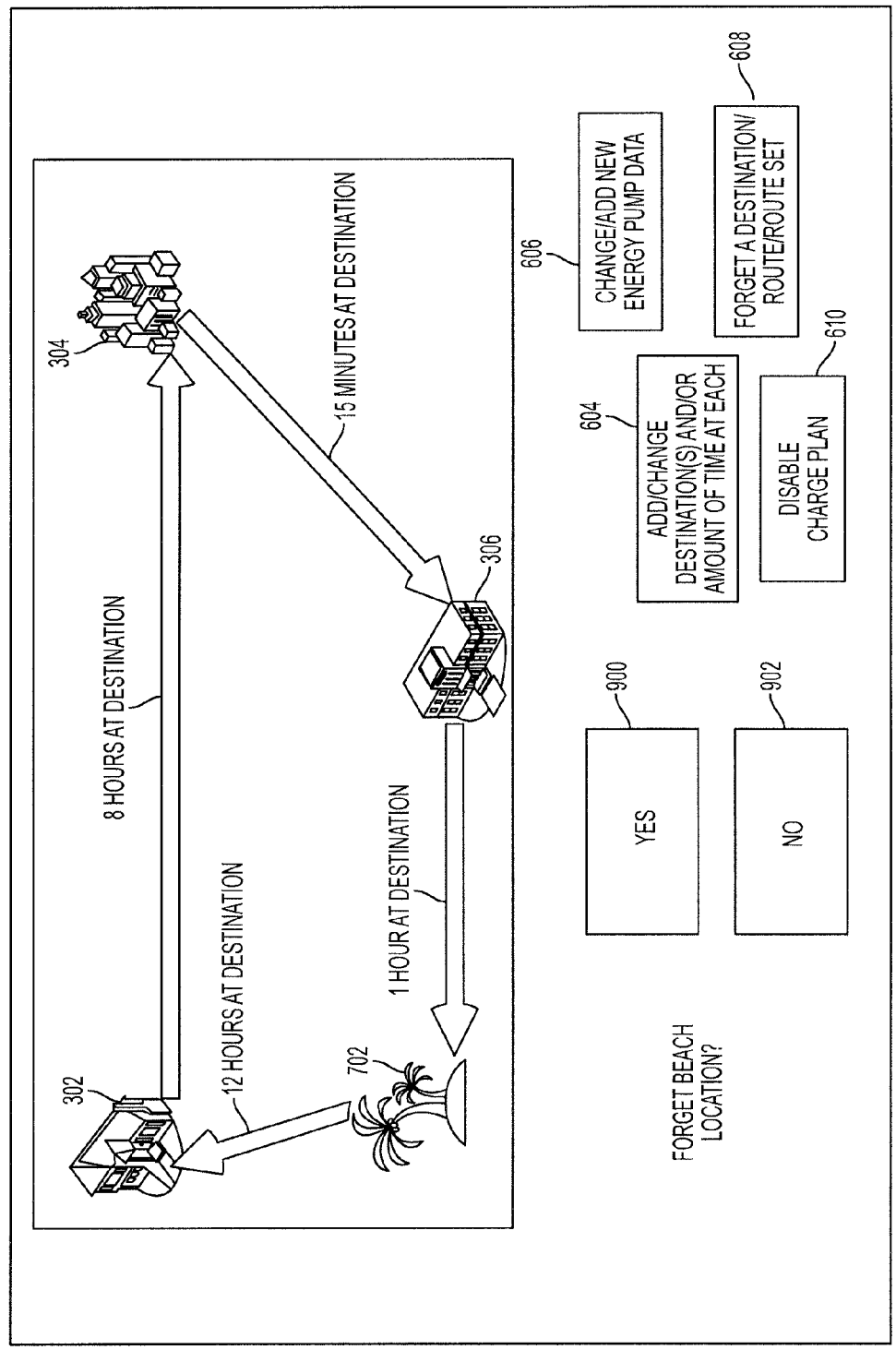
FIG. 9 shows exemplary information provided by the user interface of FIG. 5 including an option to allow a user to instruct an electronic control unit of the vehicle of FIG. 1 to forget a location along a route according to an aspect of the present invention.

Turning to FIG. 9, a driver can selected the button 608 to forget a destination, a route and/or a route set. For example, the driver may have taken his child to the beach 702 after school 306 every day during the summer, which was sufficiently frequent for the ECU 106 to add the beach 702 to the route set. However, at the end of summer, the driver may no longer visit the beach 702. Thus, the driver may wish for the ECU 106 to forget the beach 702 that is now associated with this route set. The user interface 126 may request verification of the selection to forget the beach 702 via a button 900 and a button 902.

Although the vehicle discussed herein is operated by a driver, the systems and methods may be equally applicable to driverless vehicles. A driverless vehicle can be provided with one or more destinations or can predict one or more routes. Based on the provided or predicted routes, an ECU of the vehicle can perform the cost-effective charge planning routine described above.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for cost-effective charge planning for a battery of a vehicle comprising:
    a battery having a state of charge (SOC) corresponding to a current amount of electrical energy stored by the battery;
    an internal electric vehicle charger coupled to the battery and configured to receive electrical energy from a charging station and transfer the electrical energy to the battery to increase the SOC of the battery; and
    an electronic control unit (ECU) coupled to the internal electric vehicle charger and configured to:
        predict a route set including a first destination and a second destination and an amount of time spent at each,
        determine a confidence value corresponding to a certainty that the predicted route set corresponds to an actual route set that will be driven,
        determine charge planning data including an amount of electrical energy required to reach the first destination from a current location, an amount of electrical energy required to reach the second destination from the first destination, a cost of electrical energy at the first destination and a cost of electrical energy at the second destination, and
        determine how much to charge the battery at the first destination and at the second destination based on the predicted route set, the confidence value and the determined charge planning data.

2. The system of claim 1 further comprising a navigation unit coupled to the ECU and configured to detect the current location of the vehicle and wherein the ECU is further configured to predict the route set based on the current location of the vehicle.

3. The system of claim 1 wherein the ECU is further configured to predict the route set based on at least one of a current time of day or a current day of the week.

4. The system of claim 1 wherein the ECU is further configured to determine that the battery should be charged to an upper SOC limit at the first destination when the cost of electrical energy at the first destination is the same as or less than the cost of electrical energy at the second destination.

5. The system of claim 1 wherein the ECU is further configured to determine that the battery should only be charged at the first destination with sufficient electrical energy to reach the second destination plus a margin of electrical energy when the cost of electrical energy at the first destination is less than the cost of electrical energy at the second destination.

6. The system of claim 1 wherein the ECU is further configured to determine that the battery should not be charged at the first destination when the battery has a sufficient SOC to power the vehicle to the second destination from the current location and the cost of electrical energy is less at the second destination than at the first destination.

7. The system of claim 1 further comprising a user interface coupled to the ECU and configured to receive at least one of:
- feedback indicating that the ECU has determined an incorrect cost of electrical energy;
- feedback requesting to disable the cost-effective charge planning;
- feedback indicating that a previously unknown charging station is present at a location; or
- feedback requesting to forget at least one of the route set or a route within the route set.

8. The system of claim 1 wherein the ECU is further configured to determine that the battery should be charged to a first SOC level at the first destination when the confidence value is greater than a threshold confidence value and to a second SOC level that is greater than the first SOC level at the first destination when the confidence value is less than the threshold confidence value.

9. The system of claim 1 further comprising a shared charge station database coupled to the ECU and to an ECU of a second vehicle and configured to store the cost of electrical energy at the first destination and the cost of electrical energy at the second destination.

10. The system of claim 1 further comprising a network access device coupled to the ECU and configured to communicate with at least one utility company and wherein the ECU is further configured to determine the cost of electrical energy at least one of at the first destination or at the second destination by querying the at least one utility company via the network access device.

11. The system of claim 1 further comprising a battery management system (BMS) coupled to the ECU and configured to at least one of detect or receive data corresponding to the SOC of the battery, wherein the ECU is further configured to determine the SOC of the battery based on the data received from the BMS and wherein the charge planning data further includes the SOC of the battery.

12. A vehicle capable of cost-effective charge planning comprising:
- a battery having a state of charge (SOC) corresponding to a current amount of electrical energy stored by the battery;
- a navigation unit configured to detect a current location of the vehicle, to predict a route set including a first destination and a second destination and an amount of time spent at each, and to determine a confidence value corresponding to a certainty that the predicted route set corresponds to an actual route set that will be driven;
- an internal electric vehicle charger coupled to the battery and configured to receive electrical energy from a charging station and transfer the electrical energy to the battery to increase the SOC of the battery; and
- an electronic control unit (ECU) coupled to the navigation unit and configured to:
  - determine an amount of electrical energy required to reach the first destination from the current location, an amount of electrical energy required to reach the second destination from the first destination, a cost of electrical energy at the first destination and a cost of electrical energy at the second destination, and
  - determine how much to charge the battery at the first destination and at the second destination based on the predicted route set, the SOC of the battery, the confidence value and the determined charge planning data.

13. The vehicle of claim 12 wherein the ECU is further configured to determine that the battery should be charged to an upper SOC limit at the first destination when the cost of electrical energy at the first destination is the same as or less than the cost of electrical energy at the second destination.

14. The vehicle of claim 12 wherein the ECU is further configured to determine that the battery should only be charged at the first destination with sufficient electrical energy to reach the second destination plus a margin of electrical energy when the cost of electrical energy at the first destination is less than the cost of electrical energy at the second destination.

15. The vehicle of claim 12 wherein the ECU is further configured to determine that the battery should not be charged at the first destination when the SOC of the battery is sufficient to power the vehicle to the second destination from the current location and the cost of electrical energy is less at the second destination than at the first destination.

16. The vehicle of claim 12 further comprising a user interface coupled to the ECU and configured to receive at least one of:
- feedback indicating that the ECU has determined an incorrect cost of electrical energy;
- feedback requesting to disable cost-effective charge planning;
- feedback indicating that a previously unknown charging station is present at a location; or
- feedback requesting to forget at least one of the route set or a route of the route set.

17. The vehicle of claim 12 wherein the ECU is further configured to determine that the battery should be charged to a first SOC level at the first destination when the confidence value is greater than a threshold confidence value and to a second SOC level that is greater than the first SOC level at the first destination when the confidence value is less than the threshold confidence value.

18. A method for cost-effective charge planning of a battery of a vehicle comprising:
- predicting, by an electronic control unit (ECU), a route set including a first destination and a second destination and an amount of time spent at each;
- determining, by the ECU, a confidence value corresponding to a certainty that the predicted route set corresponds to an actual route set that will be driven;
- determining, by the ECU, charge planning data including a current SOC of the battery, an amount of electrical energy required to reach the first destination from a current location, an amount of electrical energy required to reach the second destination from the first destination, a cost of electrical energy at the first destination and a cost of electrical energy at the second destination; and
- determining, by the ECU, how much to charge the battery at the first destination and at the second destination based on the predicted route set, the confidence value and the determined charge planning data.

19. The method of claim 18 further comprising determining, by the ECU, that the battery should be charged to an upper SOC limit at the first destination when the cost of electrical energy at the first destination is the same as or less than the cost of electrical energy at the second destination.

20. The method of claim 18 further comprising determining, by the ECU, that the battery should only be charged at the first destination with sufficient electrical energy to reach the second destination plus a margin of electrical energy when the cost of electrical energy at the first destination is less than the cost of electrical energy at the second destination.

\* \* \* \* \*